United States Patent [19]

Dragoumis et al.

[11] 3,721,898

[45] March 20, 1973

[54] APPARATUS FOR DETECTING LEAKAGE FROM OR RUPTURE OF PIPES AND OTHER VESSELS CONTAINING FLUID UNDER PRESSURE

[76] Inventors: Paul Dragoumis, 15 Karen Way, Summit, N.J.; Arthur Stirling Grimes, 148 Wicks Road, Commack, N.Y.

[22] Filed: Dec. 4, 1968

[21] Appl. No.: 781,171

[52] U.S. Cl. .................. 324/65 R, 73/49.1, 340/242
[51] Int. Cl. ......................... G01r 27/02, G01m 3/08
[58] Field of Search ....324/65, 51, 52; 340/256, 236, 340/240, 242, 243, 274; 73/88.5, 398, 398 AR, 49.1, 49.5

[56] References Cited

UNITED STATES PATENTS

| 1,281,329 | 10/1918 | Flannery et al. | 340/242 X |
| 2,544,567 | 3/1951 | Rundell | 73/398 |
| 2,759,175 | 8/1956 | Spalding | 340/242 |
| 2,930,031 | 3/1960 | Ungar | 340/243 X |
| 2,976,865 | 3/1961 | Shipley | 73/398 X |
| 3,124,132 | 3/1964 | Sullivan et al. | 73/398 X |
| 3,299,417 | 1/1967 | Sibthorpe | 340/242 |
| 2,420,148 | 5/1947 | Ostergren | 324/65 X |
| 2,553,986 | 5/1951 | Statham | 324/65 |
| 2,691,698 | 10/1954 | Schmidt | 340/256 X |
| 3,080,748 | 3/1963 | Burkley | 73/88.5 |
| 3,477,019 | 4/1969 | Hartmann | 340/256 X |

Primary Examiner—Rudolph V. Rolinec
Assistant Examiner—Ernest F. Karlsen
Attorney—Pennie, Edmonds, Morton, Taylor and Adams

[57] ABSTRACT

A frangible covering encircling the vessel in sealed relationship has insulated electrically conductive means, preferably a plurality of spaced wires, distributed over the area of the covering. A leak causes the fluid under pressure to rupture the covering, thereby increasing the resistance of the conductive means. A meter detects the change in resistance, and may set off an alarm. Tape containing insulated fine wires may be wound around the vessel with successive turns sealed together, and preferably adhered to the vessel.

6 Claims, 8 Drawing Figures

PATENTED MAR 20 1973  3,721,898
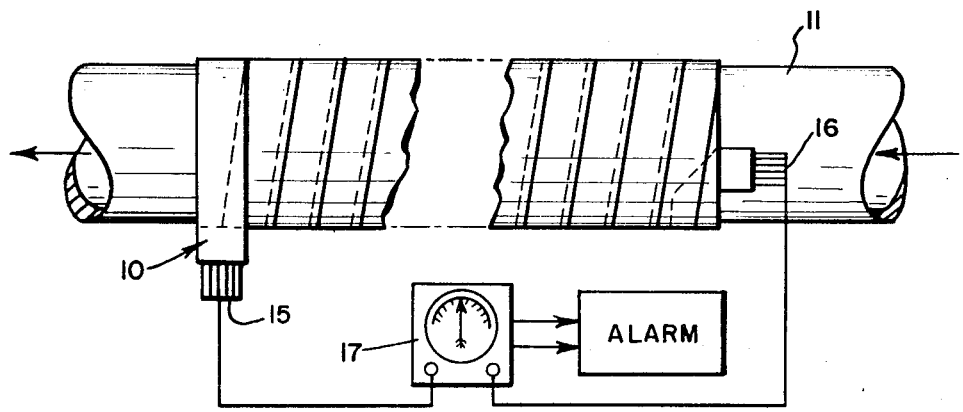
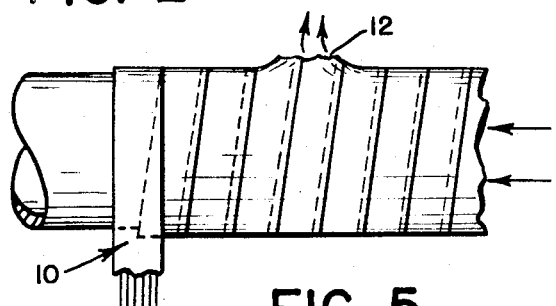
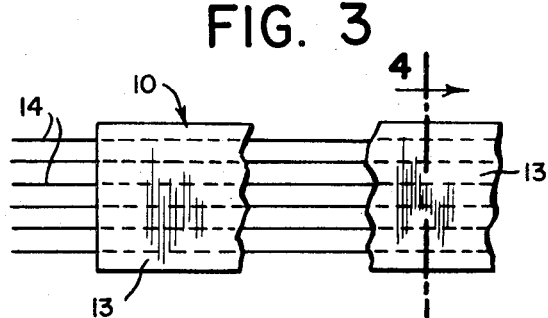
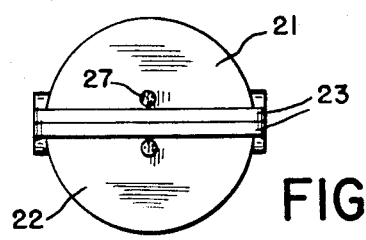
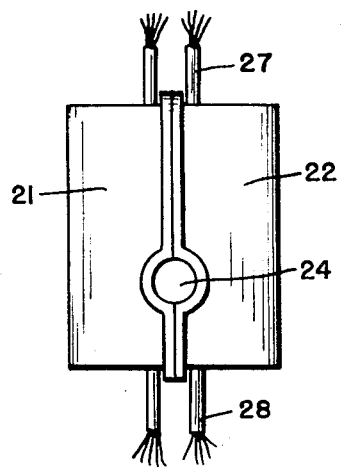
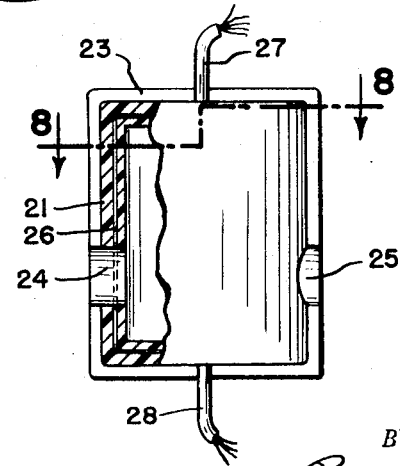
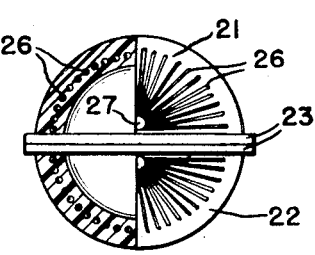
INVENTOR.
PAUL DRAGOUMIS
A. STIRLING GRIMES
BY
ATTORNEYS

APPARATUS FOR DETECTING LEAKAGE FROM OR RUPTURE OF PIPES AND OTHER VESSELS CONTAINING FLUID UNDER PRESSURE

BACKGROUND OF THE INVENTION

In certain systems containing pipes, joints, valves, tanks, pumps, compressors, etc. (hereinafter collectively termed "vessels") and carrying fluid under pressure, it is necessary to detect quickly any leakage or rupture in the system, and to locate and isolate the point of leakage. Rapid detection is particularly important where toxicity, radioactivity, high temperatures, valuable fluids, etc. are involved. Remote detection is frequently important, either due to inaccessibility or the need for prompt alarm at a central location.

SUMMARY OF THE INVENTION

In accordance with the invention a frangible covering is provided which encircles the pipe, valve or other vessel in sealed relationship so that the covering is ruptured by the fluid under pressure in the vessel upon the occurrence of a leak or break therein. The covering contains insulated electrically conductive means distributed over the area of the covering so that rupture of the covering will change the resistance thereof. Detecting means responsive to changes in resistance is connected between spaced terminal points of the electrically conductive means and indicates a rupture therein. The detecting means may be a meter which indicates changes in the resistance, an on-off instrument which responds when the resistance increases above a predetermined value, etc. If desired, the detecting means may set off an alarm.

In one form of the invention a tape containing a number of laterally-spaced, longitudinally-extending fine wires is wound around the pipe or other vessel with successive turns substantially abutting or overlapping. The edge of each turn is cemented or otherwise adhered to the next, and the tape is preferably cemented to the surface of the vessel, so as to form a sealed covering which will not allow the escape of the fluid without rupturing the covering and hence changing its resistance.

In another form, the covering is preformed so that it can be placed around a vessel with which it is to be used. For example, the covering may be initially formed in two or more pieces, preferably with the interior shaped to fit the contours of the vessel. The pieces are then sealed together and to the inlet and outlet conduits of the vessel, and preferably also to the surface of the vessel. The covering contains insulated electrically conductive means distributed over the area thereof, advantageously in the form of fine wires.

BRIEF DESCRIPTION OF THE DRAWINGS

FIG. 1 shows one embodiment of the invention in which a tape is wound on a pipe to form a sealed covering;

FIG. 2 illustrates a rupture of the covering;

FIG. 3 illustrates one form of tape which is used in FIG. 1, and FIG. 4 is a cross-section thereof;

FIGs. 5 and 6 are plan and side views of another embodiment of portion invention particularly useful for valves, etc.;

FIG. 7 is a view at right angles to FIG. 6 with a portion of the covering broken away; and FIG. 8 is a cross-section along the line 8—8 of FIG. 7.

DESCRIPTION OF THE SPECIFIC EMBODIMENTS

FIG. 1 shows a frangible tape covering formed by a tape 10 wound around pipe 11. The pipe carries fluid under pressure as indicated by the arrows. The tape is wound so that successive turns substantially abut or overlap (as specifically shown), so that substantially the entire surface of the pipe is covered and no gaps are left where leakage could occur without being detected. The edges of each turn are sealed to the adjacent turns so that no leakage can occur without rupturing the tape covering. Advantageously the entire surface of the tape covering is adhered to the pipe. Suitable adhesives may be used to seal adjacent turns of the tape, and to adhere the tape to the pipe, and may be selected to meet operating conditions. The adhesive should produce a seal between adjacent turns which is at least as strong as the tape itself, and preferably stronger. The overall effect of the tape covering is to provide a continuous barrier to the flow of fluid escaping from the pipe such that no fluid can escape without rupturing the covering.

FIG. 2 illustrates the rupture of the tape covering at 12, the rupture breaking at least a portion of one or more turns of the tape.

FIGs. 3 and 4 illustrate the frangible tape 10 used in FIG. 1. It comprises a thin elongated strip 13 of pliable plastic, impregnated fiber glass or cloth, metal foil, etc., as suits the conditions of the intended application. Fine electrically conductive wires 14 are embedded therein (as shown), or may be affixed to one side of the strip or sandwiched between two thin sheets. The wires are spaced laterally of the tape and extend longitudinally thereof. The wires are insulated from each other and from the pipe or other vessel to which the tape is affixed. With a strip of insulating material, bare wires may be embedded therein. If the strip material is not insulating, insulated wire may be employed. To prevent longitudinal splitting without breaking one or more wires, lateral threads of non-conducting material, or of conducting material insulated from the longitudinal wires, may be used to make the tape somewhat stronger in the lateral direction than in the longitudinal direction. Also, instead of separate fine wires, the wires may be formed by printed circuit techniques.

Referring back to FIG. 1, the wires at the ends of the tape are connected together at 15 and 16 to form terminal points. Meter 17 is connected between the terminal points and responds to changes in the resistance of the tape. The meter may be of any suitable type. For example, it may contain a low-voltage source which causes current to flow through the tape, and an ammeter for measuring the current. If desired, the meter may be arranged to actuate an alarm whenever the current drops below a predetermined value.

As will be understood, wherever a rupture occurs such as illustrated in FIG. 2, one or more of the individual wires in the tape will be broken, thereby increasing the resistance between terminals 15 and 16 which is indicated on meter 17.

The arrangement of FIG. 1 may be used with vessels other than pipe, such as heat exchanger shells, tanks, pipe connections, etc,. or in general wherever the tape can be wound around the vessel in such a manner as to form a sealed frangible covering encircling those portions where leakage detection is desired.

The material and thickness of the strip 13 and the fineness of the wires 14 may be selected in view of the pressures encountered in a given application so that the covering will rupture if a leak in the vessel occurs. If desired, two or more layers of tape may be used to increase reliability.

FIGS. 5-8 show a modification particularly suitable for vessels of irregular geometry such as valves, pipe connections, etc., although it could also be used for pipes and other cylindrical vessels. Here the frangible covering is in the form of a shell initially formed in two pieces 21,22 with flanges 23, as by molding or casting. Advantageously, the interior of the shell is shaped to fit the vessel with which it is to be used. Openings 24,25 are provided for inlet and outlet conduits of the vessel (not shown) and shaped to fit closely therearound. The two pieces are then placed around the vessel and sealed together and to the inlet and outlet conduits. Heat sealing and/or adhesives may be employed, and should form joints which are stronger than the covering itself so that no fluid can escape without rupturing the wall of the covering. If the covering is made form-fitting, the wall thereof is advantageously cemented or otherwise adhered to the vessel it encircles.

Electrically conductive means is distributed over the area of the covering and insulated from the enclosed vessel. As specifically shown, a number of wires 26 are embedded in the wall of each section of the covering and extend between terminal points at the top and bottom thereof. Thus in section 21, as seen in FIGS. 7 and 8, the wires fan out from terminal point 27 over the top of the covering, pass down the wall of the covering in spaced relationship, and fan in at the bottom to terminal point 28. Section 22 is similar. With a covering of insulating material as shown, bare wires may be embedded therein. Otherwise insulated wires may be used as described above for tape.

Upper and lower pairs of terminal points may be connected together and to a meter in the manner shown in FIG. 1. If, in operation, fluid under pressure leaks from the enclosed vessel, at least a portion of the wall of the covering will be ruptured, thereby breaking one or more of wires 26. Consequently the resistance between terminal points 27 and 28 will increase and cause the meter reading to change.

In lieu of individual wires, the electrically conductive means in the tape 10 of FIG. 1 or in the wall of the covering of FIG. 5 may be a thin conductive foil sufficiently weak, together with the tape or wall, to rupture under the pressures encountered in the particular application. Wires are in generally preferred, inasmuch as the breaking of one wire removes the entire length thereof from the measuring circuit, whereas a rupture of only a portion of a conductive foil increases the resistance only at or near the rupture. Thus the foil may not yield as great a change in resistance, particularly in a covering of the type shown in FIG. 5.

In systems having various combinations of pipes, valves, etc., various portions may be provided with suitable coverings and provided with individual meter circuits, so that the location of a leak can be quickly determined. Or, if desired, two or more coverings may be connected in parallel to a single meter.

The invention has been described in connection with specific embodiments thereof. It will be understood that variations are possible to suit the intended application.

We claim:

1. Apparatus for detecting leakage from pipes and other vessels containing fluid under pressure which comprises
    a. a separately-formed frangible fluid-tight covering encircling said vessel in sealed fluid-tight relationship therewith and constructed and arranged to be ruptured by fluid under pressure escaping from the vessel,
    b. said frangible covering being a tape wound around said vessel with the edges of one turn thereof substantially abutting or overlapping adjacent turns and sealed thereto to form said fluid-tight covering,
    c. said tape including insulated electrically conductive means extending lengthwise of the tape and extending laterally over a substantial portion of the width of the tape so that, when wound around said vessel, said conductive means is distributed over the area of the covering whereby rupture of the covering will change the resistance of the electrically conductive means,
    d. and detecting means connected between terminal points of said electrically conducting means spaced lengthwise of the tape for detecting changes in said resistance.

2. Apparatus for detecting leakage from pipes and other vessels containing fluid under pressure which comprises
    a. a separately-formed frangible fluid-tight covering encircling said vessel in sealed fluid-tight relationship therewith and closely adjacent to the surface thereof,
    b. said casing being constructed and arranged to be ruptured by fluid escaping from the vessel within the normal operating range of pressures thereof,
    c. said frangible covering containing insulated electrically conductive means adhered with said covering and distributed over substantially the entire area thereof whereby rupture of the covering will break at least a portion of the electrically conductive means and thereby change the resistance thereof,
    d. and detecting means connected between spaced terminal points of said electrically conductive means for detecting changes in said resistance.

3. Apparatus according to claim 2 in which the frangible fluid-tight covering is adhered to the surface of said vessel.

4. Apparatus according to claim 2 which said electrically conductive means comprises a plurality of spaced wires extending between said terminal points.

5. Apparatus according to claim 1 in which said electrically conductive means comprises a plurality of wires spaced laterally of said tape and extending longitudinally thereof.

6. Apparatus according to claim 5 in which said tape is adhered to the surface of said vessel.

* * * * *